Oct. 2, 1928.  
G. DIDERRICH  
1,686,229  
AUTOMOBILE BRAKE TESTING DEVICE  
Filed Oct. 28, 1925   2 Sheets-Sheet 2
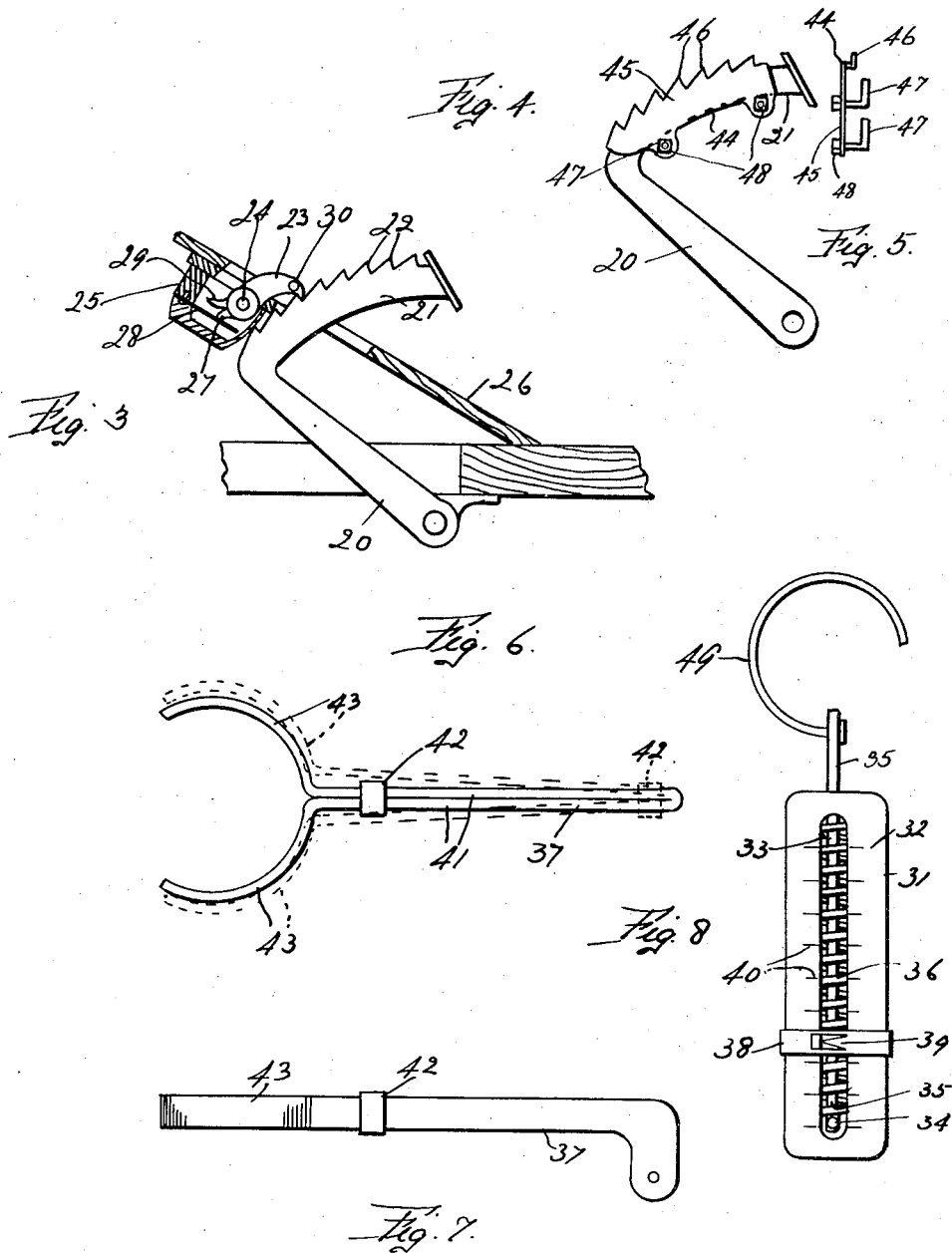
INVENTOR  
Gustave Diderrich  
By W. W. Williamson Atty.

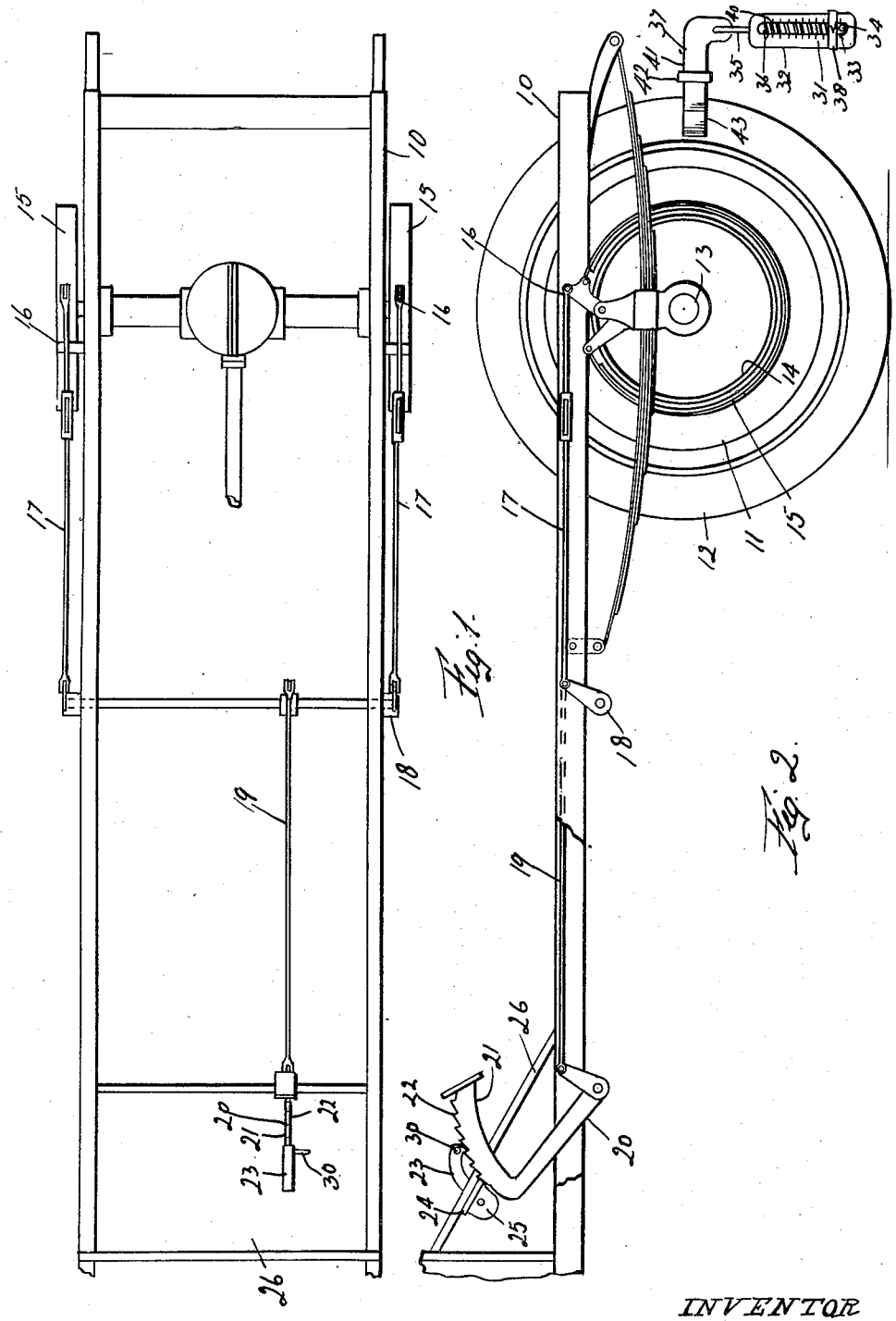

Patented Oct. 2, 1928.

1,686,229

UNITED STATES PATENT OFFICE.

GUSTAVE DIDERRICH, OF ELKINS PARK, PENNSYLVANIA.

AUTOMOBILE BRAKE-TESTING DEVICE.

Application filed October 28, 1925. Serial No. 65,328.

My invention relates to new and useful improvements in an automobile brake testing device for use in adjusting the brakes in order that all the said brakes will have an equal braking strength.

Another object of the invention is to improve the construction of brake testers in order that the brakes of all wheels of a vehicle are readily and quickly equalized.

A further object of the invention is to provide means for holding a brake in any adjustable position during the testing thereof.

A still further object of the invention is to provide for combined use of a means to hold the brake in a predetermined position and means to indicate an adjustment of the several brake elements in order that all the said elements shall be equalized so as to simultaneously start the braking operations at a given point in the movement of the brake pedal.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a fragmentary plan view of an automobile chassis, illustrating an application of my invention.

Fig. 2, is a side elevation thereof partly in section, and with the far side wheel shown thereon.

Fig. 3, is an enlarged side elevation of the brake pedal and component parts showing its relative position on the foot board of an automobile illustrated in sections.

Fig. 4, is a side elevation of a brake pedal showing the ratchet teeth in the form of a rack detachably secured to the pedal.

Fig. 5, is an end view of the rack.

Fig. 6, is a plan view with clamp for attaching the testing device to the wheel or tire, the dotted lines showing it in an open position.

Fig. 7, is a side elevation thereof.

Fig. 8, is a front elevation of a testing device provided with means for connection with a spoke of the vehicle wheel.

In adjusting automobile brakes it is essential that the braking elements be equally applied and that they "take hold" at a given point in the movement of the brake pedal. This is particularly true where a vehicle is provided with four wheel brakes, because with an uneven application of the latter type, skidding is often caused when the brakes are not easily applied. It is usual when adjusting brakes to have a person hold the brake pedal at a desired point and then adjust the brake bands or elements and to judge when the several brake bands are in the same positions. The person holding the brake pedal often tires, and by the time a second or other brake band is being adjusted, the brake pedal may be in a different position, or again, the person adjusting the brakes may be unable to tell whether or not he has used the same strength in turning one wheel as another, and therefore the brakes will not be equalized.

These disadvantages are entirely overcome by my invention, because the brake pedal and other elements of the brake may be positively set at a given point, and on each wheel a brake band tested until it requires the same "pull" to move all of the wheels; said "pull" being determined by a testing indicator.

In carrying out my invention as herein embodied, 10 represents a vehicle herewith shown as an automobile, and includes wheels 11 on which are tires 12, and said wheels are mounted upon an axle 13, with which are associated brake drums 14 and brake bands 15; the latter being connected with suitable levers 16 connected by rods 17 with the crank 18, to which is attached one end of a rod 19, having its other end pivoted to a portion of a brake pedal 20.

As shown in Figs. 1, 2 and 3, the arm 21 of the brake pedal has a number of ratchet teeth 22 formed along one edge for coaction with the ratchet pawl or dog 23 suitably supported adjacent the arm 21 of the brake pedal, as on a shaft 24 in a housing 25 beneath the foot board 26. This ratchet pawl or dog is provided with a lug 27 for coaction with a spring 28 whereby said ratchet pawl or dog may be temporarily retained in an operative or inoperative position under spring tension, and in order to prevent the dog from being thrown too far back, an extension 29 is provided which will engage the spring and act as a stop after the lug 27 has passed a center line thru the axle 24 which line is at right angles to the spring 28. In order to manipulate the dog for throwing it in or out of operative position, a pin 30 projects from one side of the dog adjacent its nose so that it may be engaged by one foot of the operator, while the other foot is on the brake pedal.

When it is desired to adjust the brakes, the nose of the dog is moved into engagement with the ratchet teeth 22 on the brake pedal, and the latter then depressed until the nose of the dog engages the tooth which positions the brake pedal at the point where the operator desires the brakes to begin an application; after which each brake band or element may be adjusted until it requires the same power to move each of them; thereby indicating that the brake bands are beginning to tighten at the same point.

In order to ascertain the exact point or strength of the application of the brakes, I provide a testing indicator 31 in the form of a scale, which may be of a well-known spring type, in which 32 represents the casing having a longitudinal slot 33, thru which projects a pin 34, carried by the inner end of the beam 35; said beam being normally forced into the casing under the tension of the spring 36, and the outer end of said beam is attached to a clamp 37. The scale is preferably provided with a "dead" pointer 38 here shown as a band surrounding a casing and slidable thereon with an arrow 39 for coaction with the graduations 40.

The pin 34 on the inner end of the beam 35 coacts with the pointer to carry it along the casing when a test is being made, but as soon as the pressure is removed from the scale, the beams will be returned to its normal position by the action of a spring, but will leave the pointer at its highest point on the scale casing.

The clamp 37 to which the scale is attached includes a pair resilient arms 41 which tend to separate, as shown by dotted lines in Fig. 6, but which may be moved toward each other by means of the sleeve 42 slidably mounted on said arms, and at the outer ends of these arms are formed the arcuate jaws 43 adapted to surround a tire as illustrated in Fig. 2, or a portion of a vehicle wheel, and when said jaws are placed about the tire and the arms 41 drawn together by the sleeve 42, the clamp will be securely held about the tire, thus permitting pulling upon the scale in an attempt to rotate the wheel, and the amount of force thus used will be indicated on the scale if the latter is released just as the wheel begins to turn. When a test has been made on one wheel and the pointer has been moved to some other graduation on the scale, another of the wheels may be pulled in the same manner, and these operations carried on from time to time during the adjusting of the brake, or until the force necessary to move each wheel is found to be the same, thereby indicating that all the elements of the brake are operating under the same amount of force.

In Fig. 4, I have shown a modification of my invention which is particularly adapted for use on automobiles or other vehicles which are already on the market, and in which the ratchet tooth rack is detachably fastened to the brake pedal. In this form of the invention, 44 represents the ratchet tooth rack including a plate 45 for disposal along one side face of the brake pedal arm 21 with the outer edge of said plate, bent at right angles to overlie the upper edge of the pedal arm and then again bent at right angles so as to stand outward, in which portion the teeth 46 are formed; thru this plate pass the threaded shanks of L-shaped bolts 47, which engage the face of the pedal arms 21 opposite the plate 44 and have nuts 48 threaded on the shanks to draw the parts together.

In Fig. 8, I have shown a testing scale which is particularly adapted for use with wheels having spokes wherein the outer end of the beam 35 is a hook 49 attached thereto adapted to partially surround the spoke of a wheel.

As the ratchet teeth on the brake pedal and the dog in addition to their utilization for testing brakes may also be used for holding the brakes in different adjusted positions when the automobile is standing on or descending a grade, thus giving some of the advantages of the features found in an emergency brake.

Of course I do not wish to be limited to the exact details of construction as herein shown, as these may be varied within the limits of the appended claims without departing from the spirit of my invention.

Having thus fully described my invention, what I claim as new and useful is:

1. In a device of the character stated, a testing indicator comprising a casing having a longitudinal slot, a beam slidable in the casing, a pin on the inner end of the beam projecting thru the slot, a spring tending to hold the beam normally within the casing, a pointer movable on the casing independent of the beam and adapted to coact with the pin on the beam whereby it may be moved along the casing, as the casing is moved relative to the beam, and a spring clamp attached to the beam of the indicator, and means to temporarily fasten said clamp about a portion of a vehicle wheel.

2. In a device of the character stated, a testing device including a scale, and means for temporarily attaching said scale to a vehicle wheel, said means comprising a pair of opposed resilient arms normally tending to separate, due to the resiliency thereof, there being arcuate jaws at the outer ends of said arms, means to force said arms toward each other to clamp the jaws about the wheel, and means at the end of the arms opposite the jaws for connection with the aforementioned scale.

In testimony whereof, I have hereunto affixed my signature.

GUSTAVE DIDERRICH.